July 15, 1941. D. E. GRAHAM ET AL 2,249,521
METHOD FOR THE REHABILITATION OF FILTER UNITS
Filed Nov. 7, 1938 2 Sheets-Sheet 1
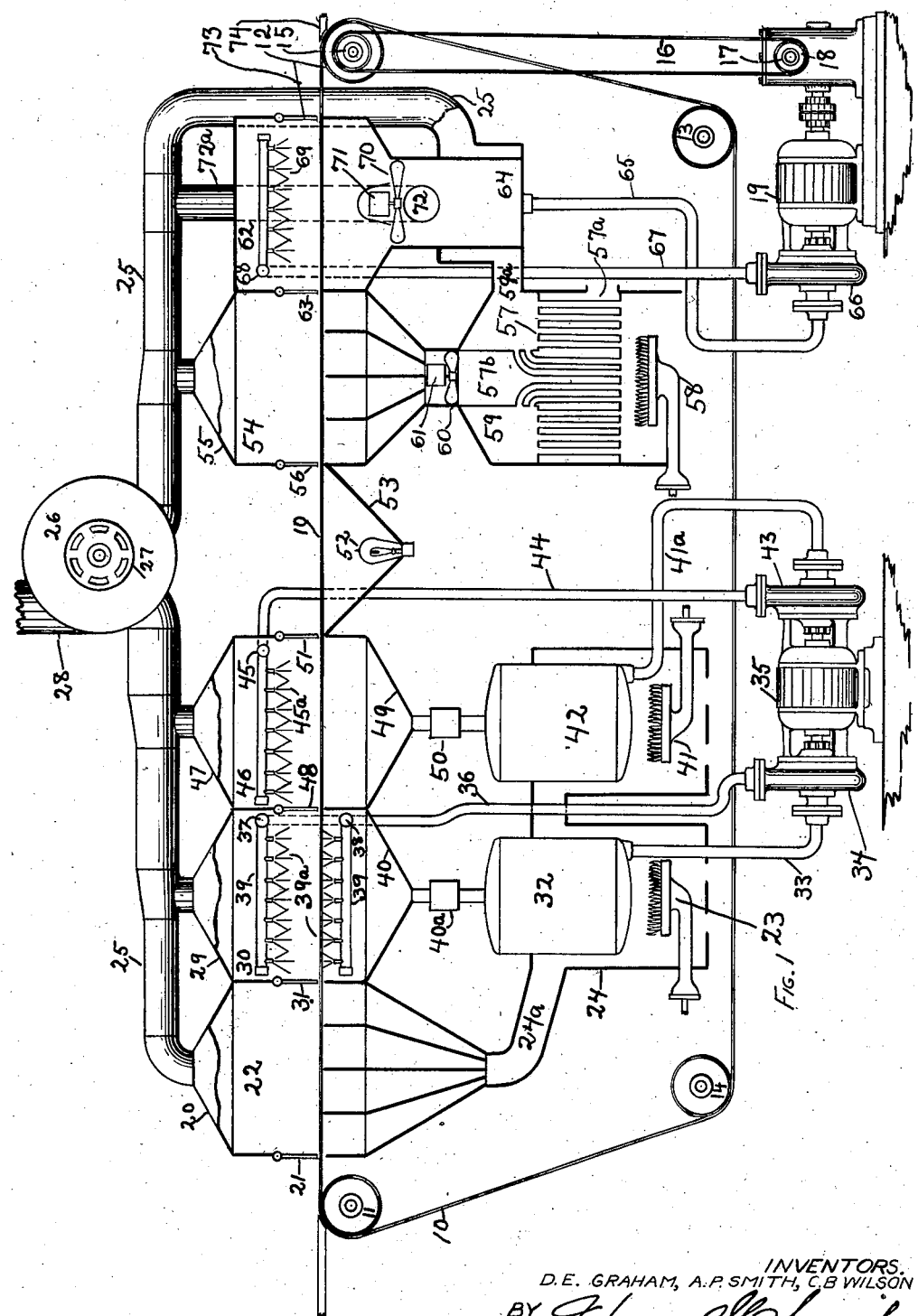
INVENTORS.
D. E. GRAHAM, A. P. SMITH, C. B. WILSON
BY Homer G. Sweet.
ATTORNEY.

July 15, 1941.  D. E. GRAHAM ET AL  2,249,521
METHOD FOR THE REHABILITATION OF FILTER UNITS
Filed Nov. 7, 1938  2 Sheets-Sheet 2
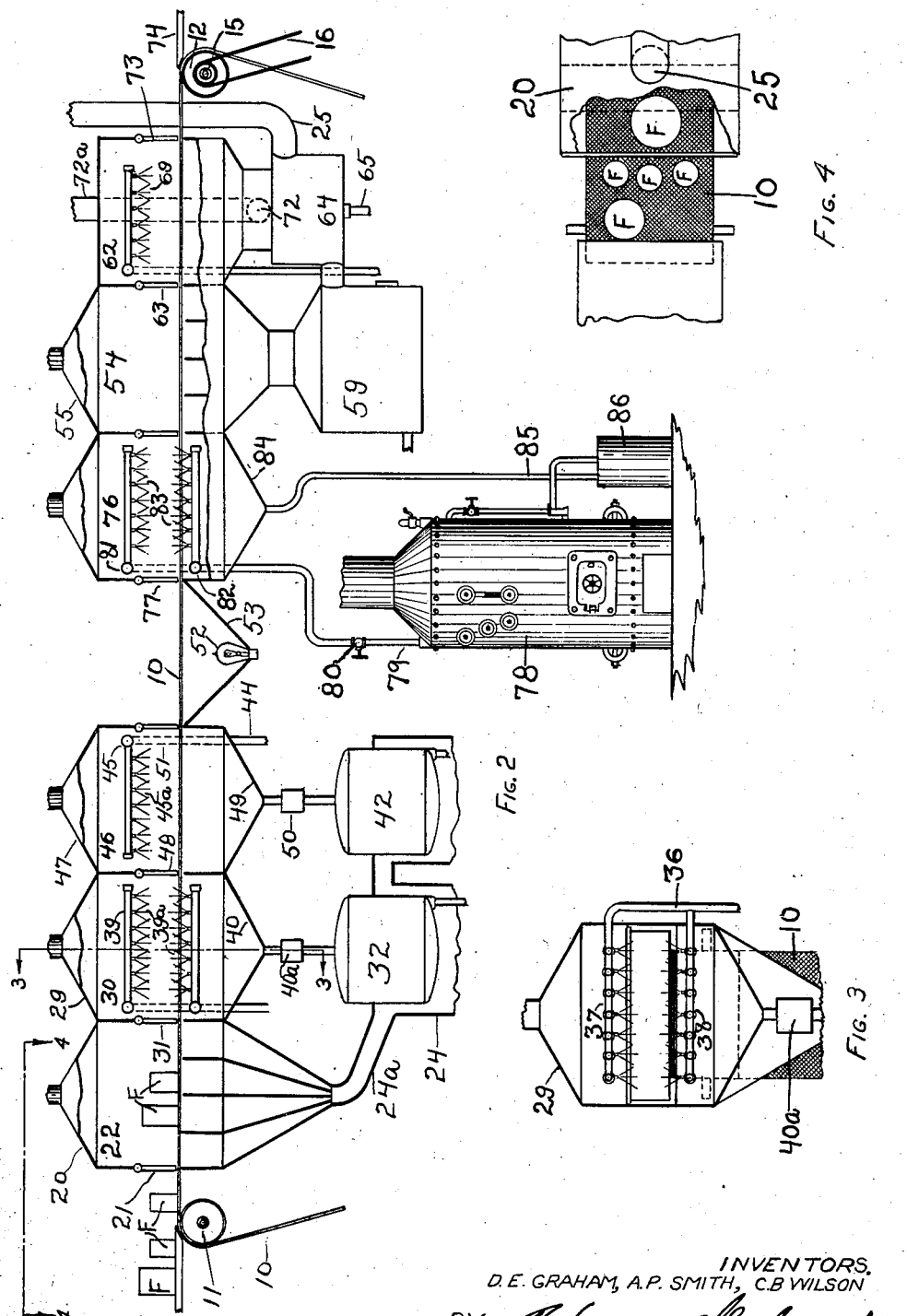
INVENTORS.
D. E. GRAHAM, A. P. SMITH, C. B. WILSON
BY
ATTORNEY.

Patented July 15, 1941

2,249,521

UNITED STATES PATENT OFFICE 2,249,521

METHOD FOR THE REHABILITATION OF FILTER UNITS

Duncan Earl Graham and Alfred P. Smith, Denver, and Carl B. Wilson, Wheatridge, Colo.

Application November 7, 1938, Serial No. 239,334

2 Claims. (Cl. 141—1)

This invention relates to a method of rehabilitating air filter units of a type commonly used in connection with air conditioning apparatus.

One of the objects of the invention is to provide an efficient method of cleansing and rehabilitating such units.

Another object of the invention is to provide a process having progressive stages such as to efficiently renew and rehabilitate such filter units.

A further object of the invention is to provide a method including an inspection stage, whereby the efficiency of the operation may be accurately judged.

A further object of the invention is to provide a method of rehabilitating air filter units wherein such units are gradually and thoroughly preheated and dried, then cleansed, then rinsed, and then redried.

A further object of the invention is to provide a process which is continuous in operation.

A further object of the invention is to provide a process which may easily be availed of in connection with conventional means.

In connection with air conditioning apparatus types at present customarily employed, there is used a filter comprising a cylindrical shell having open ends and containing a filler comprising a mass of fibrous or other suitable material, which may be spun glass or a functional equivalent. In the course of use such filters become contaminated through the collection of impurities from the air passing therethrough, rendering the filter unfit for further use. We have provided in our invention a method whereby such filters, when so rendered unfit for further use, may be easily rehabilitated and reinserted in the apparatus in connection with which they are designed for use. Our invention is particularly adapted for use and practical application in service stations maintained for the servicing of such filter units for the various users thereof, and permits such servicing to be accomplished expeditiously and economically.

We find it desirable in the rehabilitation of filters of said type to first heat and dry the same, thereupon to apply thereto a suitable cleansing solution, thereafter to rinse the same, again dry the same, and thereupon to apply thereto a small amount of oil carried by an air draft, and to this end we employ an endless belt to carry the filters under treatment through a series of chambers for progressively carrying out the process steps by suitable apparatus associated with said chambers. We have found that by applying a preliminary gradual heating step in the process it is possible thereafter to apply a cleansing solution heated to a relatively high temperature, without injury to the filters under treatment, and thereafter to carry out further stages of the process more efficiently, as will appear from the detailed description of the method steps and apparatus used in connection therewith.

Our invention consists in the nature, relation, sequence and combination of individual steps hereinafter set forth, pointed out in our claims, and diagrammatically illustrated in the accompanying drawings, in which—

Figure 1 is a conventionalized diagrammatic representation of means and apparatus advantageously employed in the practical exercise of the invention, comprising a suitable endless conveyer belt and apparatus for the supply of suitable air drafts, sprays, heating apparatus, and the like, as will be more particularly hereinafter described. Figure 2 is a like conventionalized representation of an operative assembly for the same purpose as illustrated in Figure 1, in Figure 2, however, an alternative arrangement being shown comprising steam apparatus which may supplement certain of the functions for which the apparatus is employed in the embodiment of the invention illustrated in Figure 1. Figure 3 is a representation of a portion of the apparatus shown in Figure 2 viewed as indicated by the line 3—3. Figure 4 is a representation of a portion of the apparatus shown in Figure 2 viewed as indicated by the line 4—4.

Referring to the drawings and at this time more particularly to Figure 1 thereof: A carrier belt 10, preferably formed of reticulated material, is suitably arranged for slowly carrying the filter units under treatment through the various chambers within which successive process steps are applied, filter units F of various sizes disposed on said belt for such carriage being shown in Figure 2. Belt 10 is suitably associated with pulleys 11, 12, 13, and 14, which rotate clockwise, thus carrying the filter units under treatment in a direction from pulley 11 toward pulley 12. Belt 10 is driven by pulley 12, to which power is applied by means of pulley 15, concentric with pulley 12 and securely fixed thereto for rotation therewith. Pulley 15 is driven by a belt 16 which is driven by a pulley 17 rotated by an output shaft of a speed reducer of conventional type 18, which may be suitably associated with an electric motor 19 furnishing power for the actuation of the apparatus involved. Belt 10 passes through a series of chambers 22, 30, 46, 54 and 62. Chambers 22, 30, 46, and 54 are arranged for the maintenance of up-drafts, for which purpose said chambers are respectively provided with hoods 20, 29, 47, and 55, said hoods having in the top portions thereof suitable outlets communicating with an exhaust duct 25, connecting with an outlet pipe 28. For the purpose of maintaining a draft through the chambers above mentioned and duct 25 we provide an exhaust fan of conventional type, the casing of which is designated by the numeral 26, driven by an electric motor 27 and suitably disposed to expel air and fumes through outlet pipe 28. Chamber 62 is likewise connected with exhaust duct 25, but in such manner as to provide a down-draft in chamber 62, as will be more fully hereinafter referred to.

The chambers may be of any suitable material, such as sheet metal, and may be of any convenient shape, each, however, having an upper and lower portion, between which belt 10 passes. Said chambers are provided with doors 21, 31, 48, 51, 56, 63 and 73, overhanging belt 10 and freely swingable in vertical arcs to permit the ready entrance and exit of filter units, carried on belt 10, to and from the interiors of said chambers.

The first step in the process consists in the gradual application of heat to the filters under treatment, said heating operation being carried on in chamber 22. For the purpose of furnishing an upward hot air draft through chamber 22 we provide an appropriate heat source 23, which may consist of a gas burner, which may be enclosed in a suitable chamber 24, having inlets to furnish communication with the exterior atmosphere, and being provided with an upward extending duct 24a, communicating with the lower part of chamber 22 for the purpose of furnishing a passageway for air heated by burner 23, the hot air draft through chamber 24 being aided by exhaust fan 26. The filters under treatment become gradually heated in the course of their passage through chamber 22, to a suitable and efficient temperature for the purpose of subsequent treatment.

The next step is a cleansing process, carried on in chamber 30. For this purpose we provide a tank 32, which may contain any suitable cleansing solution, which may be heated to the requisite temperature by any suitable source of heat, in the arrangement shown the gas burner 23 being availed of for this purpose. The cleansing solution passes from tank 32 through downwardly extending pipe 33 to and through pump 34, which may conveniently consist of a conventional gear pump driven by an electric motor 35, whereby the cleansing solution is forced upward through the pipe 36, said pipe entering chamber 30 and being provided with suitable connections and fittings within said chamber for spraying filters being carried through said chamber on belt 10. For such purpose pipe 36 communicates with two pipes 37 and 38, extending transversely of belt 10, one being above and one below said belt. Pipes 37 and 38 may communicate with a number of pipes 39 extending longitudinally of belt 10 and in planes parallel therewith, such an arrangement being indicated in Figure 3. The pipes 39 within chamber 30 extending transversely and longitudinally of belt 10 are provided with suitable jets 39a, the jets associated with the pipes above belt 10 opening downward and the jets associated with the pipes below said belt opening upward, the arrangement being thus adapted for the directing of sprays of cleansing solution upon the tops of filter units passing through chamber 30 and also upon the bottoms of said filter units through reticulated belt 10. Excess cleansing solution is caught by collecting basin 40 and passes through a pipe communicating therewith, through a filter 40a, back to tank 32.

The next step is a rinsing treatment, carried on in chamber 46. For this purpose we provide a tank 42, containing water, which may be heated to the requisite temperature by any suitable source of heat, in the arrangement shown, the gas burner 41 being availed of for this purpose. The water passes from tank 41 through downwardly extending pipe 41a to and through pump 43, which may conveniently consist of a conventional gear pump driven by the electric motor 35, whereby the heated water is forced upward through the pipe 44, entering chamber 46 and being provided with suitable connections and fittings within said chamber for spraying filters being carried through said chamber on belt 10. For such purpose pipe 44 communicates with pipe 45 extending transversely of belt 10, above said belt. Pipe 45 may communicate with a number of pipes extending longitudinally of belt 10 and in a plane parallel therewith, in an arrangement similar to that described with reference in connection with chamber 30, but above belt 10. The pipes within chamber 46 extending longitudinally of belt 10 are provided with suitable jets 45a, opening downward, the arrangement being thus adapted for the directing of sprays of hot water upon the top of filter units passing through chamber 46. Any excess water is caught by the collecting basin 49 and passes through a pipe communicating therewith through a filter 50 back to tank 42.

After the filters have been thoroughly rinsed in chamber 46 they are carried by belt 10 into an open space for inspection. To facilitate inspection we provide a convenient light source such as an electric lamp 52 disposed below belt 10 in a reflector 53 arranged to direct the light rays upward. By this arrangement the efficacy and completeness of the cleansing and rinsing treatments hereinabove mentioned may be judged, and if such treatments be found unsatisfactory any filter not satisfactorily cleansed and rinsed may be removed at this stage of the process and returned for repetitious treatment through the cleansing stage.

The next step is a drying process, carried on in chamber 54. For this purpose we provide a chamber 59, disposed below and communicating with chamber 54, and containing suitable apparatus for supplying clean hot air to chamber 54. For such purpose we employ a series of hollow intercommunicating leaves, made of metal, and diagrammatically represented in the drawing, being therein designated by the reference numeral 57; these leaves may be heated to the requisite temperature by any suitable source of heat, in the arrangement shown the gas burner 58 being availed of for this purpose. Air passes from the exterior atmosphere through inlet 57a, through leaves 57 and into a duct 57b, preferably circular in cross section and extending upwardly to and communicating with chamber 54. A fan 60 driven by an electric motor 61 is suitably disposed within duct 57b so as to draw the heated air from leaves 57 upwardly and into chamber 54, the maintenance of the upward draft through chamber 54 being aided by exhaust fan 26 as hereinbefore explained. The upward draft of hot air through chamber 54 passes through reticulated belt 10, and through and around filters thereon being carried through chamber 54, thereby thoroughly drying said filters. To carry away fumes which may be generated by burner 58, chamber 59 is provided with an outlet 59a leading to duct 25, through which said fumes are expelled by means of fan 26 through outlet pipe 28.

The final step consists in subjecting the cleansed and dried filters to an oil spray, and this operation is carried on in chamber 62. In the lower part of this chamber we provide a vessel 64, containing oil. The oil passes from vessel 64 through downwardly extending pipe 65 to and through pump 66, which may conveniently consist of a conventional gear pump driven by an electric motor 19, whereby the oil is forced upward through the pipe 67 entering chamber 62 and being provided with suitable connections and fittings within said chamber for spraying filters being carried through said chamber on belt 10. For such purpose pipe 67 communicates with pipe 68 extending transversely of belt 10 and above said belt. Pipe 68 may communicate with a number of pipes extending longitudinally of belt 10 and in a plane parallel therewith, the arrangement being similar to that described in reference to chamber 30. The pipes within chamber 62 extending transversely of belt 10 are provided with suitable jets 69, opening downward, the arrangement being thus adapted for the directing of sprays of oil upon the tops of filter units passing through chamber 62. For the purpose of aiding in the down draft in chamber 52 we provide a vent 72 in the lower part of chamber 62 and below belt 10, said vent communicating with duct 25 through a duct 72a; and an exhaust fan 70 driven by an electric motor 71 is suitably disposed with reference to vent 72 and duct 72a to produce a draft to duct 25, thereby supplementing motor 26 in creating a draft through chamber 62, vent 72, duct 72a and duct 25 through outlet pipe 28. In this manner, filters carried through chamber 62 on belt 10 are oiled to render them suitable for re-use.

The filters leaving chamber 62 are carried by belt 10 to a platform 74, whence they may be removed by an attendant for suitable disposition, the filters having, by the steps hereinbefore described, now been thoroughly rehabilitated and being now ready for insertion and re-use in the air conditioning apparatus to which they respectively pertain.

An optional, additional step may be introduced into the process, between the rinsing step and the air drying step hereinabove mentioned, said additional step consisting of subjecting the filters under treatment to a steam spray, providing additional cleansing and drying. An arrangement suitable for employing this additional step is illustrated in Figure 2, the apparatus being in all respects identical with that illustrated on Figure 2 and described with reference thereto, except an additional tank 76 and associated apparatus. In Figure 2 we have indicated the chambers wherethrough belt 10 passes by the same reference numerals as used in Figure 1, it being understood that the associated apparatus employed in connection with each of said chambers is the same as shown in Figure 1, although details thereof are omitted on Figure 2. Chamber 76 is similar to chamber 30 and its interior is traversed by belt 10 for the purpose of carrying filters therethrough. Chamber 76 is disposed between reflector 53 and chamber 54 and is provided with an entrance door 77 freely swingable in a vertical arc and identical with other doors hereinabove mentioned. Chamber 76 has suitable communication between its upper portion and duct 25. To supply steam to carry on the treatment in chamber 76 we provide a boiler 78 which may be any conventional type of stationary boiler, may be provided with the usual fittings and may have any convenient heating means. Steam passes from boiler 78 through pipe 79 through valve 80 in pipe 79, said valve being of any convenient type, to permit shut-off or regulation of the flow of steam through pipe 79. Pipe 79 enters chamber 76 and is provided with suitable connections and fittings within said chamber for spraying filters being carried through said chamber on belt 10. For such purpose pipe 79 communicates with pipes 81 and 82, extending transversely of belt 10, one being above and one below said belt; said pipes 81 and 82 may communicate with a number of pipes extending longitudinally of belt 10 and in planes parallel therewith, such an arrangement being similar to that indicated in Figure 3. The pipes within chamber 76 extending longitudinally of belt 10 are provided with suitable jets 83, the jets associated with the pipes above belt 10 opening downward and those associated with the pipes below said belt opening upward, the arrangement being thus adapted for the directing of sprays of steam upon the tops of filter units passing through chamber 76 and also upon the bottoms of said units through reticulated belt 10. Water formed by the condensation of steam from jets 83 may gather in collecting basin 84, in the lower part of chamber 76, and flow through pipe 85 to a tank 86 whence it may be again introduced into boiler 78 by any suitable means.

It will thus be seen that the essentials of my process, carried out either by the steps indicated in Figure 1 and in the description based upon said figure, or with the additional step indicated in Figure 2 and in the description based upon said figure, consists of the progressive steps of preheating the filter under treatment, thoroughly cleansing the same, drying the same and impregnating the filler thereof with oil, whereupon the filter is completely rehabitated for re-use. It will further be observed that the process is continuous and is completed within a minimum period of time. Thus by carrying out the steps indicated, the filter may be treated without injury, may be repetitiously used, and subjected to repeated rehabilitations after such periods of reuse, thereby effecting a great saving in the expense hitherto occasioned by replacing filters in air conditioning apparatus.

Since the apparatus wherethrough the improved method may be practiced is susceptible of infinite variation without material change in the functional characteristics productive of the treatment sought, and since changes and variations in degree and in relative operative association of the phases constituting the improved method may be had, we wish to be understood as being limited solely by the scope of the appended claims, rather than by any details of the illustrative showing and foregoing description.

We claim as our invention:

1. The method of rehabilitating a filter comprising a shell and filler, which method comprises drawing heated air through said filler, thereafter passing through said filler a heated cleansing solution, passing through said filler a heated rinsing liquid, and impregnating said filler with oil.

2. The method of rehabilitating a filter comprising a shell and filler, which method comprises drawing heated air through said filter for a sufficient period of time to thoroughly heat and dry said filler, thereafter passing through said filler a heated cleansing solution, therafter rinsing and rying said filler, and passing through said filler a current of oil-charged air.

DUNCAN EARL GRAHAM.
ALFRED P. SMITH.
CARL B. WILSON.